United States Patent
Toni

(10) Patent No.: US 7,394,465 B2
(45) Date of Patent: Jul. 1, 2008

(54) DISPLAYING AN IMAGE USING MEMORY CONTROL UNIT

(75) Inventor: Hemminki Toni, Tampere (FI)

(73) Assignee: Nokia Corporation, Espoo (FI)

( * ) Notice: Subject to any disclaimer, the term of this patent is extended or adjusted under 35 U.S.C. 154(b) by 234 days.

(21) Appl. No.: 11/110,984

(22) Filed: Apr. 20, 2005

(65) Prior Publication Data

US 2006/0238541 A1    Oct. 26, 2006

(51) Int. Cl.
*G09G 5/39*    (2006.01)
*G09G 5/00*    (2006.01)
*G06F 13/00*   (2006.01)
*G06F 12/02*   (2006.01)

(52) U.S. Cl. ............... 345/531; 345/649; 345/537; 345/538; 345/544

(58) Field of Classification Search .......... 345/531, 345/649, 537, 538, 544, 656, 658
See application file for complete search history.

(56) References Cited

U.S. PATENT DOCUMENTS

| | | | |
|---|---|---|---|
| 5,543,824 A | * | 8/1996 | Priem et al. ............ 345/539 |
| 6,597,364 B1 | | 7/2003 | Chiu et al. ............. 345/562 |
| 6,819,334 B1 | * | 11/2004 | Owada et al. .......... 345/659 |
| 2004/0157647 A1 | * | 8/2004 | Takahashi ............. 455/566 |
| 2004/0239690 A1 | * | 12/2004 | Wyatt et al. ........... 345/649 |
| 2005/0184993 A1 | * | 8/2005 | Ludwin et al. ........ 345/502 |
| 2006/0149915 A1 | * | 7/2006 | Maly ..................... 711/172 |

* cited by examiner

*Primary Examiner*—Daniel Washburn
(74) *Attorney, Agent, or Firm*—Perman & Green, LLP

(57) ABSTRACT

A memory control unit controls the transfer of image data from a video buffer to a frame buffer, and from the frame buffer to a display, to be performed block by block. Image data is written from a video buffer to the frame buffer one block at a time. When image data for the entire block has been written to the frame buffer, the data for that block can be refreshed on the display. Image data for the next frame can only be written to the frame buffer once the data in that block has been refreshed on the display. In this way, image tearing can be eliminated. Images can also be successfully rendered when the direction of writing data to the frame buffer is perpendicular to the direction of copying data from the frame buffer and refreshing the display. Thus, landscape images can be rendered on a portrait display, without the need for double buffering.

12 Claims, 6 Drawing Sheets

DISPLAYING AN IMAGE USING MEMORY CONTROL UNIT

FIELD OF THE INVENTION

The present invention relates to a method for displaying an image. The present invention also relates to apparatus for displaying an image.

BACKGROUND OF THE INVENTION

FIG. 1 shows a known method for generating animations. The image data 2 for each frame is generated by program running on a computer (not shown). To generate animations, the computer writes one frame of the animation to a frame buffer 4 at a time. The frame buffer 4 has sufficient memory to store only one image frame. The contents of the frame buffer 4 are transferred to a display 6 in horizontal lines 8 from the top of the image to the bottom of the image. In parallel, the computer writes the image data 2 corresponding to the next frame to the frame buffer 4 in horizontal lines 10 from the top of the image to the bottom of the image. It is necessary that the computer writes only to the portion of the frame buffer 4 from which has already been copied to the display 6.

Image tearing is a well-known problem in displaying computer-generated animations. An example of image tearing is shown in FIG. 2. Image tearing can occur when the writing of image data 2 to the frame buffer 4 overtakes the transfer from the frame buffer 4 to the display 6 or vice versa. Here, the computer therefore writes to a part of the image that has not yet been refreshed on the display 6. The display 6 then contains image data from one frame 10 at the top of the display 12, and the image data from the next frame 14 on the bottom of the display 16. When the content of the two frames 10, 14 are different, the result is a torn image, which can appear as flickering to a user.

A further problem can occur when the image stored on the frame buffer 4 is in landscape format. This is illustrated in FIG. 3. The computer writes the image data 2 corresponding to the landscape frame in horizontal lines 10 from top to bottom. However, the image frame is rotated to display it on a portrait-oriented display 6, and therefore the contents of the frame are transferred to the display 6 in vertical lines 8 from left to right. It is therefore impossible to update the frame correctly using the technique described above, as there always is overlap between two consecutive frames.

The simplest way to avoid this problem is to write a complete frame of image data 2 to the frame buffer 4, and then pause the writing of image data 2 to the frame buffer 4 while the display 6 is refreshed. This is unsatisfactory since it can slow down the frame rate considerably.

One technique used to minimise image tearing is known as 'double buffering'. In this technique, two buffers are used, where one frame is known as the front buffer and the other frame is known as the back buffer. The back buffer is used to render a frame out of sight i.e. without it being displayed. A previously rendered, complete frame is stored in the front buffer. The contents of the front buffer are transferred to the display to be viewed by a user. When the frame on the back buffer is complete i.e. the frame is filled with image data, the front and back buffers are swapped. The next frame is then written to the new back buffer whilst data from the front buffer is transferred to the display. Only fully rendered images are presented to the user, so image tearing is eliminated. Ideally, the exchange of front and back buffers occurs instantaneously. However, in practise there is a small delay while the buffers swap. This can slow down the frame rate.

The double buffering technique also requires double the amount of memory of the conventional system, and such systems can be costly to build.

Double buffering allows flexible display orientation since data is never rendered to the same frame buffer that is used to transfer data to the display, so the different reading and writing directions are unimportant.

The inventor appreciates that it would be advantageous to provide an improved method for image display while avoiding the risk of image tearing whilst not requiring parallel frame buffers.

SUMMARY OF THE INVENTION

A first aspect of the present invention provides a method of displaying an image, comprising:
  using a memory control unit to divide a buffer comprising a two dimensional array of memory cells into at least first and second blocks;
  writing data to a first one of the blocks; and
  copying said data from the first one of the blocks to a corresponding block of a display,
  wherein the writing and copying steps are repeated for sequential ones of the blocks, and wherein the writing of data to the blocks is in a direction perpendicular to the direction of copying data from the blocks.

The can allow image display without image tearing whilst avoiding the need for two parallel frame buffers, and is useable when both landscape and portrait orientations are required to be supported.

A further aspect of the present invention provides apparatus for displaying an image comprising:
  a buffer comprising a two dimensional array of memory cells;
  a display; and
  a memory control unit arranged to divide the buffer into at least first and second blocks, to write data to a first one of the blocks, and to copy said data from the first one of the blocks to a corresponding block of the display,
  wherein the memory control unit is also arranged to write data to sequential ones of the blocks sequentially and copy data for sequential ones of the blocks sequentially, and wherein the writing of data to the blocks is in a direction perpendicular to the direction of copying of data from the blocks.

Embodiments of the present invention will now be described, by way of example only, with reference to the accompanying drawings.

BRIEF DESCRIPTION OF THE DRAWINGS

In the drawings.

In the Figures, reference numerals are used for like elements throughout.

DETAILED DESCRIPTION OF PREFERRED EMBODIMENTS

Figure 1:
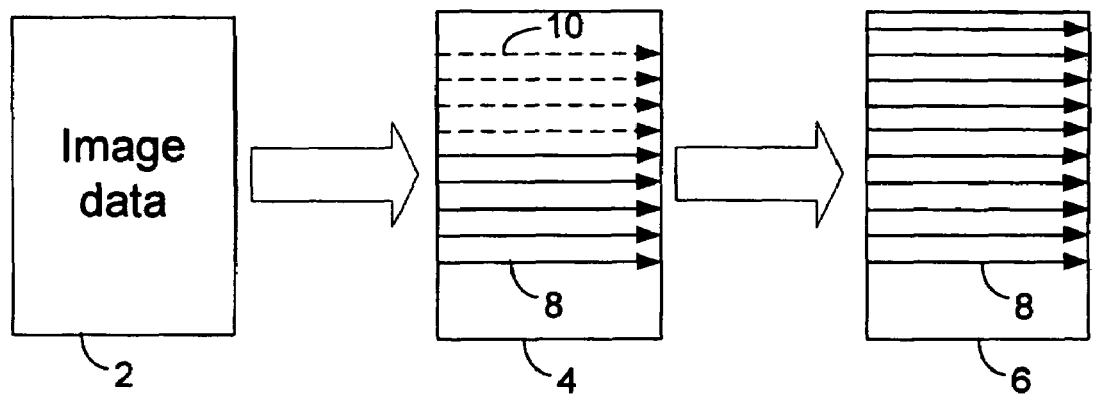
FIG. 1 illustrates displaying a portrait image according to the prior art.
Figure 2:
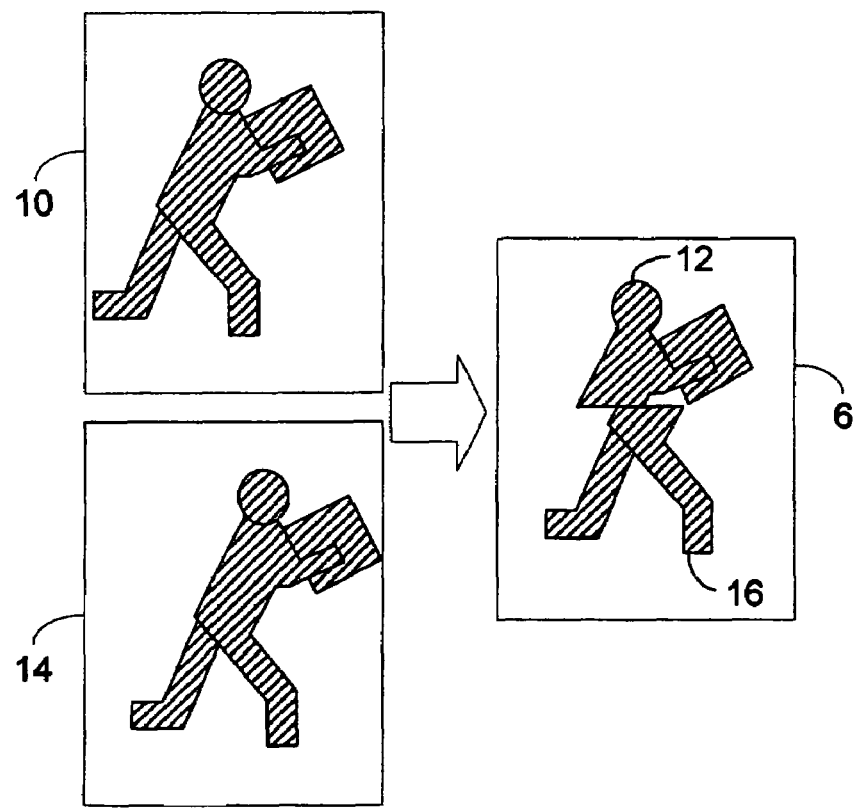
FIG. 2 illustrates an example of image tearing in a display.
Figure 3:
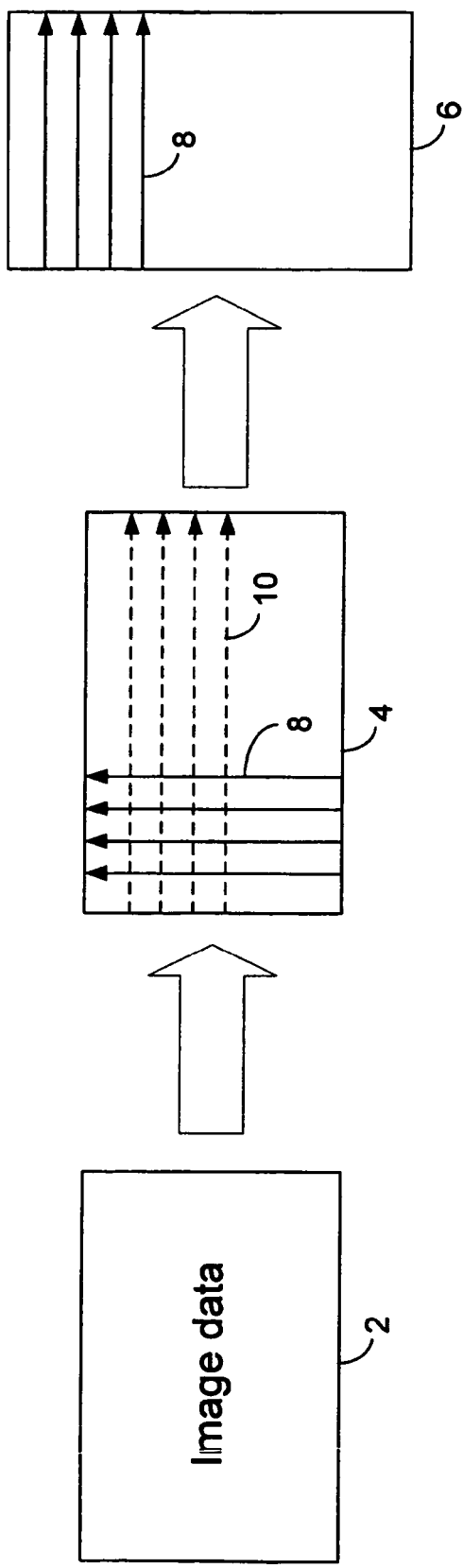
FIG. 3 illustrates attempting to display a landscape image using the FIG. 1 prior art system.
Figure 4:
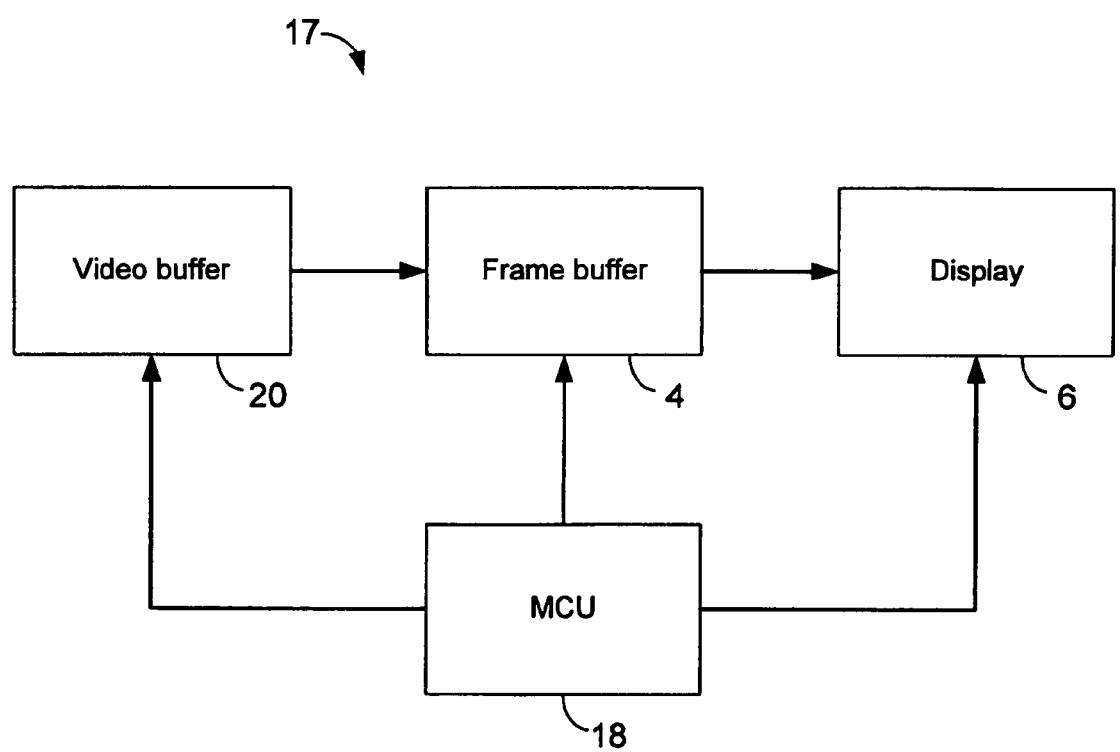
FIG. 4 is a schematic drawing of apparatus for displaying images according to the invention.

Referring firstly to FIG. 4, image displaying apparatus 17 comprises a memory control unit 18, a video buffer 20, a frame buffer 4 and a display 6. The image display apparatus forms part of a mobile, handheld device, such as a mobile telephone, smartphone or PDA.

The memory control unit (MCU) 18 has output controls connected to respective ones of the video buffer 20, the frame buffer 4, and the display 6. The video buffer 20 has a data output connected to a data input of the frame buffer 4. The frame buffer 4 has an output connected to a data input of the display 6.

The MCU 18 controls the writing of image data 2 from the video buffer 20 to the frame buffer 4, as well as the transfer of the image from the frame buffer 4 to the display 6 to refresh the display 6. The MCU 18 divides the frame buffer 4 into first to fourth blocks 61, 62, 63, 64. The frame buffer 4 is not physically divided up into blocks: the MCU 18 controls writing of image data 2 to the frame buffer 4 to be performed block by block. The MCU 18 also controls the transfer of data from the frame buffer 4 to the display 6 to be performed block by block. In this way, the frame buffer 4 is divided into virtual blocks.

The video buffer 20 may be constituted by physical memory. Alternatively, it may be the output of a program, running on a processor, which generates image data in real time, for example during game play.

The frame buffer 4 can be located in a system RAM of a computer. Alternatively, the frame buffer 4 can be located in a discrete display module, which also houses the display 6. When the frame buffer 4 is housed in the system RAM of a computer, and the image on the frame buffer 4 is in landscape format, rotation techniques are used to transfer the image on the frame buffer 4 to the display 6. When the frame buffer 4 is housed in the display module with the display 6, the display module itself can handle the rotation, and the transfer from the frame buffer 4 to the display 6 is in the same direction as the transfer from the video buffer 20 to the frame buffer 4.

The data transfer from the video buffer 20 to the frame buffer 4 is preferably carried out on a DMA (Direct Memory Access) channel. This allows data to be transferred from memory to the destination device without passing through a CPU. Therefore, data transfer can take place quickly, compared to data transfer on other channels. For the same reasons, preferably data transfers from the frame buffer 4 to the display 6 use a DMA channel.

Figure 5A:
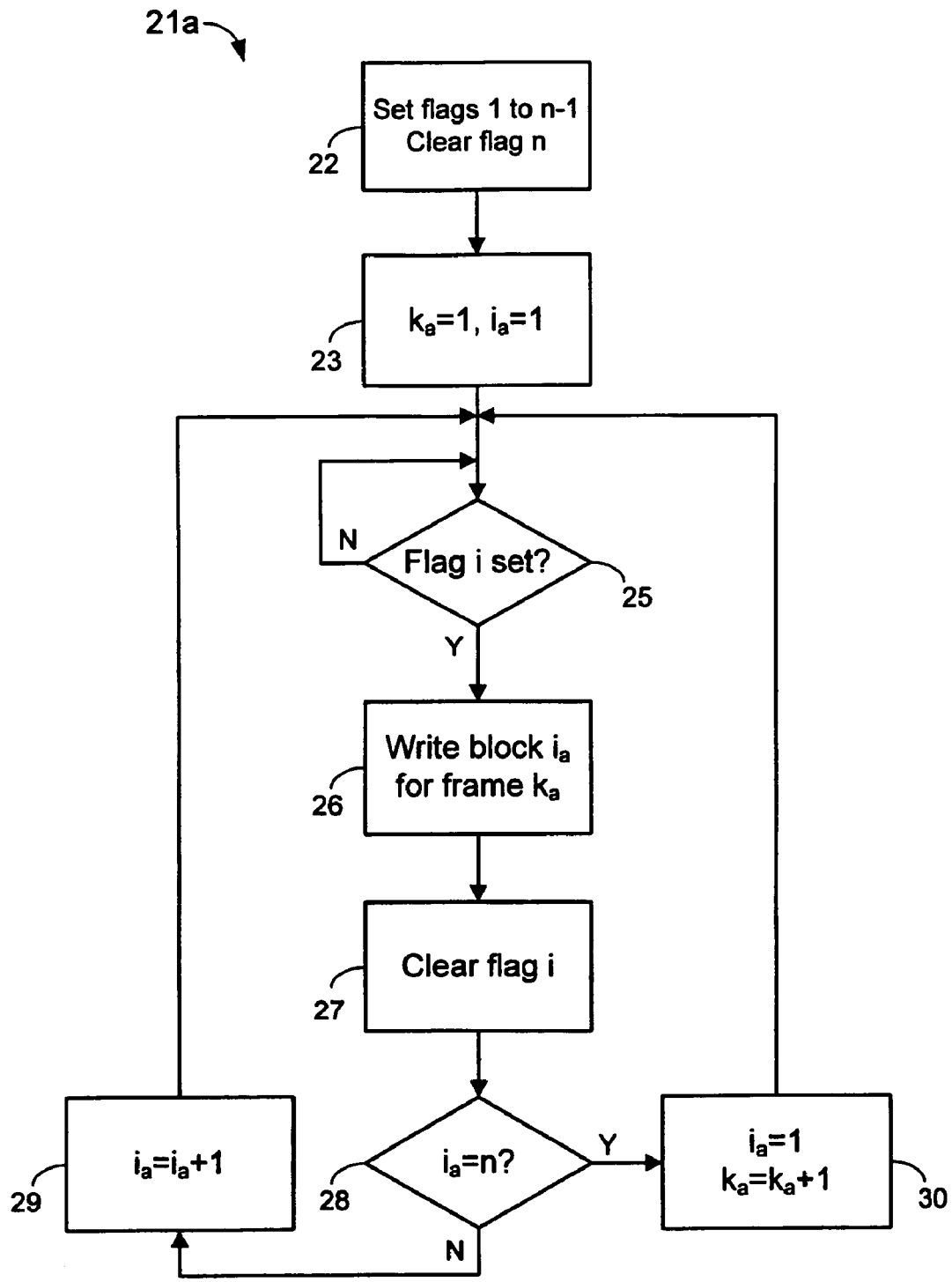
FIGS. 5a and 5b are flowcharts illustrating operation of the FIG. 4 apparatus according to the invention.
Figure 5B:
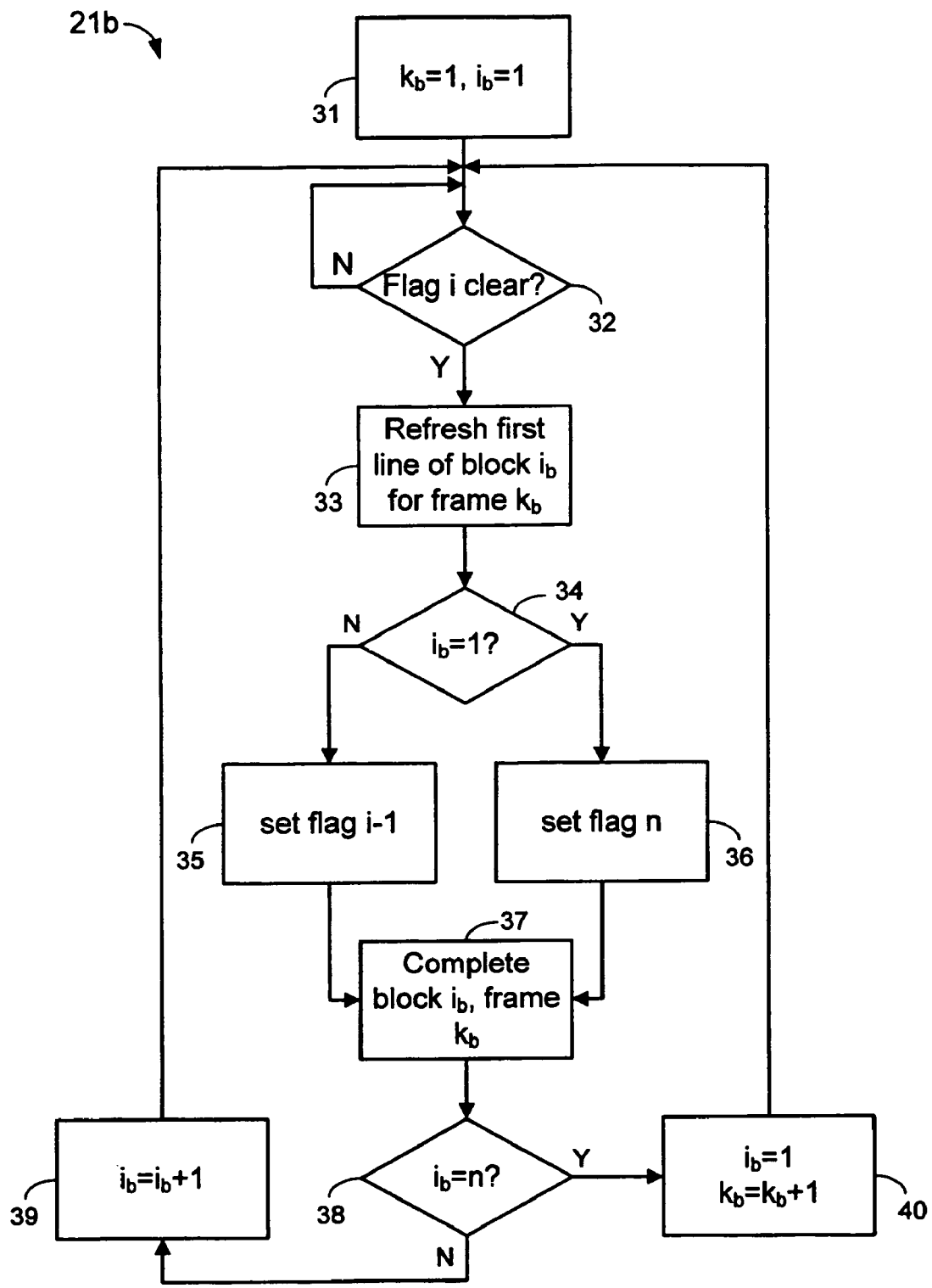
Figure 6:
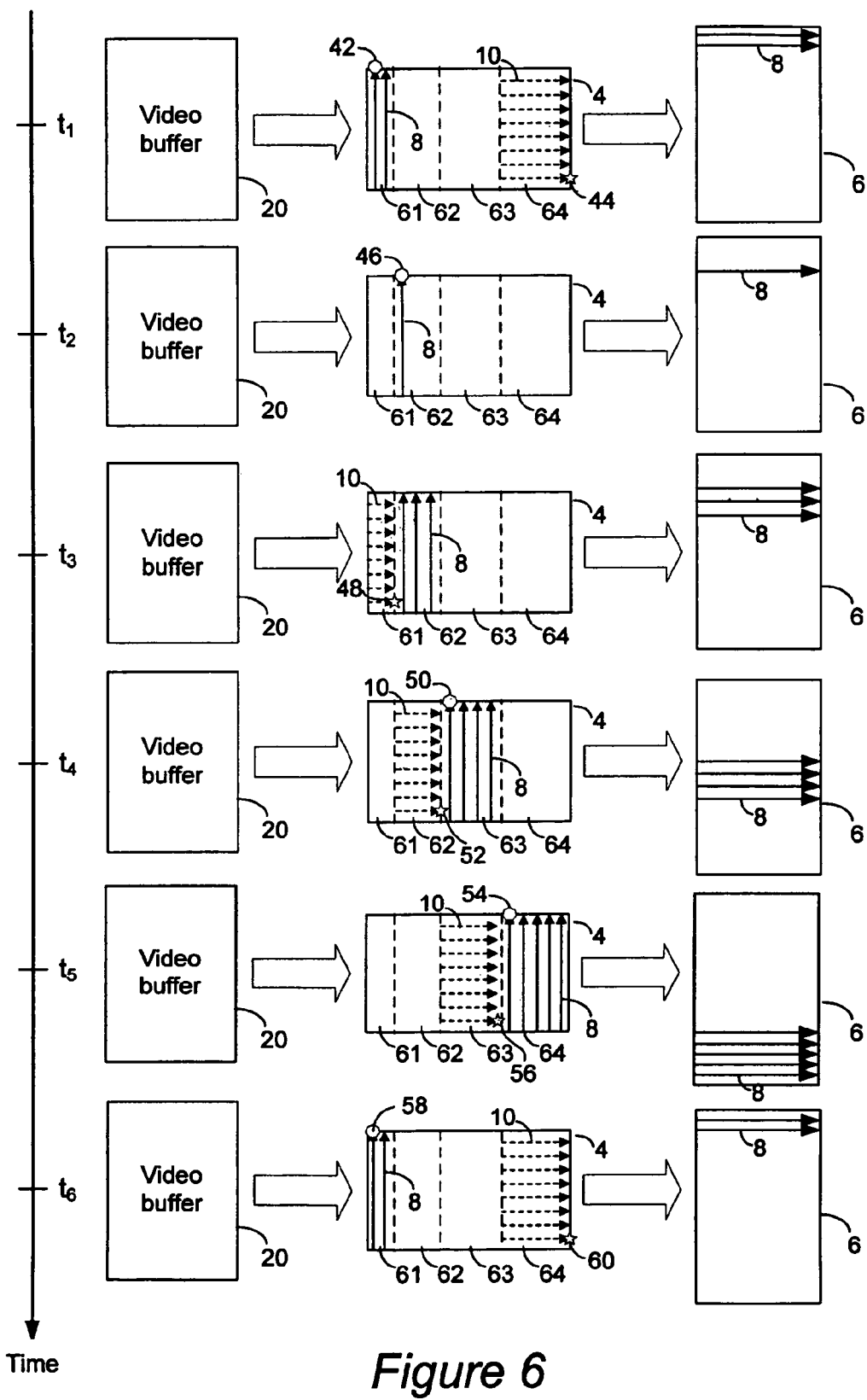
FIG. 6 illustrates displaying a landscape image according to buffer and display states at various times in the operation of the FIG. 4 system.

Operation of the FIG. 4 apparatus is illustrated in FIGS. 5a, 5b, and 6. The operation is described for handling landscape images. However, the same operation can be used for displaying portrait images. Briefly, the apparatus prevents the writing of image data 2 from the video buffer 20 to the frame buffer 4 overtaking the refreshing of a block of the image from the frame buffer 4 to the display 6 and vice versa. In the following embodiment, the frame buffer 4 is not housed in the display module. Therefore, the direction of writing of image data 2 to the frame buffer 4 is different to the direction of writing data to the display 6. In this example, the number of blocks, n, is equal to 4. Each block 61, 62, 63, 64 comprises at least two lines.

FIG. 5A shows a first data transfer process 21a from the video buffer 20 to the frame buffer 4. FIG. 5B shows a second data transfer process 21b from the frame buffer 4 to the display 6. The first and second data transfer process 21a, 21b take place in parallel and are controlled by the MCU 18. The first and second data transfer processes 21a, 21b communicate with each other through the use of the flags. There is one flag for each of the n-blocks of the frame buffer 4 and the display 6. Instructions for controlling the MCU 18 to perform the steps of the first and second data transfer processes 21a, 21b are stored in the form of one or more computer programs within a memory of the FIG. 4 mobile device. The computer program or programs may be provided as a transient signal, for transport over a communications link, or stored on a readable medium prior to installation on the mobile device.

Referring first to FIG. 5A, operation begins at step 22 by the setting of all of the flags except the last flag, and clearing the last flag. At step 23, $k_a$ and $i_a$ are initialised to 1. $k_a$ denotes the frame number that the first data transfer process 21a is currently handling. $i_a$ denotes the block number that the first data transfer process 21a is currently handling. Following step 23, the first data transfer process 21a is ready to write the first block of data from the video buffer 20 to the frame buffer 4.

At step 25, it is determined whether the $i^{th}$ flag is set. If the flag is not set, the first data transfer process 21a proceeds again to the input of step 25. In this way, the first data transfer procedure 21a is held until the $i^{th}$ flag becomes set. Once the step 25 produces a positive answer, the process 21a proceeds to step 26. Here, the block $i_a$ for frame $k_a$ is written from the video buffer 20 to the frame buffer 4. Following this, the $i^{th}$ flag is cleared at step 27. Subsequently, step 28 determines whether the value of $i_a$ is equal to n, which determines whether the block written in step 26 is the last block in the frame. If step 28 produces a negative result, step 29 increments the value of $i_a$, and the procedure then returns to the input of step 25. If step 28 produces a positive result, step 30 resets the value of $i_a$ to 1, and increments the value of $k_a$, before the process 21a returns to the input of 25.

Reference is now made to FIG. 5B, which shows a second data transfer process 21b. This process 21b relates to data transfer between the frame buffer 4 and the display 6.

At step 31, the value of $k_b$, which denotes the frame number that the second data transfer process 21b is handling, and the value of $i_b$ which denotes the block number that the process is handling, are initialised to the value of 1. The process 21b then progresses to step 32, where it is determined if the flag i is clear. The flag i is clear if it has been cleared by step 27 of the first data transfer process 21a. If the flag i is not clear, the second data transfer process 21b returns to the input of the step 32. Once the flag i is clear, the process 21b progresses to step 33. Here, the first line of the block $i_b$ for the frame $k_b$ is refreshed from the frame buffer 4 to the display 6. Following this, it is determined at step 34 whether $i_b$ is equal to 1. Thus, step 34 determines whether the block whose first line is refreshed at step 33 is the first block in the frame. If step 34 yields a positive result, the flag n is set at step 36, before the process 21b proceeds to step 37. If step 34 yields a negative result, the flag i−1 is set at step 35, before the process 21b proceeds to step 37. At step 37, the block $i_b$ for frame $k_b$ is completed.

Following step 37, it is determined at step 38 whether the value of $i_b$ is equal to the value of n. Thus, this step determines whether the block which is written by steps 33 and 37 is the last block in the frame. If step 38 yields a negative result, the value of $i_b$ is incremented at step 39, before the second data transfer process 21b proceeds again to the input of step 32. If step 38 yields a positive result, the value of $i_b$ is set to 1 and the value of $k_b$ is incremented at step 40, before the second data transfer process 21b proceeds to the input of step 32.

Having described the first and second data transfer processes 21a and 21b operated by the MCU 18, operation in writing data 2 from the video buffer 20 to the display 6 will now be described with reference also to FIG. 6. FIG. 6 shows the transfer processes between and the states of the video buffer 20, the frame buffer 4 and the display 6 at different times during the display updating process constituted by the first and second data transfer processes 21a and 21b.

In FIG. 6, the frame buffer 4 is divided into first, second, third and fourth blocks 61, 62, 63, 64, increasing in size from left to right. The first block 61 is illustrated as corresponding to two lines of data, the second block 62 as corresponding to three lines of data, the third block 63 as corresponding to four lines of data, and the fourth block 64 as corresponding to five lines of data. However, this is for illustrative purposes only, and it will be appreciated that there will be many more lines of data in a typical implementation. Also, the number of blocks is chosen to provide an optimised solution, and may be fewer than or greater than 4, depending on the particular implementation.

The uppermost set of images in FIG. 6 illustrate buffer statuses at a time $t_1$. Here, the lines 8 denote the writing from the frame buffer 4 to the display 6 of data from the first block of the first frame, i.e. $k_b=1$, $i_b=1$. A first interrupt 42 occurs once the first line for the first block 61 is written from the frame buffer 4 to the display 6. This relates to the completion of step 33 of the second data transfer process 21b. The fourth flag is then set according to steps 34 and 36. The lines 10 denote the writing of data from the video buffer 20 to the frame buffer 4. The lines 10 at time $t_1$ are being written into the fourth block 64 of the frame buffer 4. Accordingly, steps 25 to 29 have previously been carried out for each of the first, second and third blocks and flags 1, 2 and 3 have been cleared by step 27. The clearing of the first flag at step 27 allowed the second data transfer process 21b, in particular step 32 thereof, to allow the refreshing of the first block 61 of image data 2 from the frame buffer 4 to the display 6. Once the first block 61 of data is refreshed to the display, step 36 sets the fourth flag. Once the first data transfer process 21a writes the last pixel of data into the fourth block 64 of the frame buffer 4, a second interrupt 44 occurs. This corresponds to the completion of block 26. Following this, the fourth flag, which relates to the last block 64 in the frame, is cleared at step 27. Following this, step 28 determines that $i_a$ does equal n, i.e. that the last block in the frame has been refreshed, so step 30 resets $i_a$ to 1 and increments the frame count $k_a$ to 2.

Next, at time $t_2$, the second data transfer process 21b is writing data 8 from the frame buffer 4 to the display 6, in particular from the second block 62 of frame buffer 4. This was possible only since the second flag was cleared by step 27 of the first data transfer process 21a after the process had written the second block 62 for the first frame. When the second data transfer process 21b has completed writing the first line of the second block 62 of the frame buffer 4 to the display 6, a third interrupt 46 occurs. This corresponds to the completion of step 33. At this point, step 34 yields a negative result, so step 35 sets the first flag, since at this stage $i_b=2$. The setting of the first flag allows the first data transfer process 21a to progress from step 25 to step 26, where it writes the first block 61 for frame $k_a=2$. This is illustrated at $t_3$ in FIG. 6. In parallel, the second data transfer process 21b writes 8 data from the second block of the frame buffer 4 to the video buffer 6. The completion of the refreshing 10 of data from the video buffer 2 to the first block of the frame buffer 4 results in a fourth interrupt 48. This results in the first flag being cleared at step 27 of the first data transfer process 21a. In the meantime, the second data transfer process 21b has completed writing 8 data from the second block 62 of the frame buffer 4 to the display 6.

Since at time t3, step 37 has completed for the second block 62, step 38 yields a negative result and step 39 increments the value of $i_b$ to 3. Since step 32 reveals that the third flag is clear, since it was cleared by step 27 following the writing of data for third block 63 by the first data transfer process 21a on the preceding frame, the second data transfer process 21b is able to implement step 33 straight away. Once the first line of the third block 63 has been refreshed from the frame buffer 4 to the display 6, a fifth interrupt 50 occurs. This is shown has having occurred prior to time $t_4$ in FIG. 6. The fifth interrupt 50 results in the second flag being set at step 35, which allows the first data transfer process 21a to write data from the video buffer 20 to the second block 62 of the frame buffer 4. At time $t_4$, the first data transfer process 21a has finished writing 10 data into the second block 62 of the frame buffer 4, and has generated a sixth interrupt 52. Also at this time, the second data transfer process 21b has finished writing data from the third block 63 of the frame buffer 4 to the display 6. Since at this time the fourth flag is clear, the second data transfer process 21b can begin refreshing data from the fourth block 64 of the frame buffer 4 to the display 6, which in this example it does.

Once the first line of the fourth block 64 has been refreshed from the frame buffer 4 to the display 6, a seventh interrupt 54 occurs. This results in the third flag being set of step 35, which allows the first data transfer process 21a to write data for the third block 63 from the video buffer 20 to the frame buffer 4 at step 26. This is illustrated as 10 at time $t_5$ in FIG. 6. When the first data transfer process 21a has finished writing data for the third block 63 from the video buffer 20 to the frame buffer 4, an eighth interrupt 56 occurs. This results in the clearing of the third flag, thereby allowing the second data transfer process 21b to refresh the display 6 with data from the third block 63 of the frame buffer 4 in due course. At time $t_5$, FIG. 6 shows that the second data transfer process 21b has just finished writing 8 from the fourth block 64 of the frame buffer 4 to the display 6. At this time, the second data transfer process 21b has refreshed the display 6 with data from all four blocks 61, 62, 63, 64 of the frame buffer 4, following the frame buffer 4 having been provided with that data from the video buffer 20 by way of the first data transfer process 21a. Also, at time $t_5$, the first data transfer process 21a has written the first 61, second 62 and third 63 blocks of the frame buffer 4 with data from the second frame.

Accordingly, at time $t_6$, the second data transfer process 21b has written 8 data from the first block 61 of the frame buffer 4 to the display, since it was allowed to do so by the clearing of the first flag by step 27 of the first data transfer process 21a following the interrupt 48 at time $t_3$. This involves a ninth interrupt 58 at the end of the first line of the first block 61. Also at time $t_6$, the first data transfer process 21a has written 10 data from the video buffer 20 to the fourth block 64 of the frame buffer 4, and a tenth interrupt 60 signals that the last pixel of this data has been written.

In the example illustrated in FIG. 6, the process of transferring data from the video buffer 20 to the frame buffer 4, i.e. the first data transfer process 21a, is faster than the second data transfer process 21b, which transfers data from the frame to the display 6. Accordingly, it is the first data transfer process 21a which tends to the wait at step 25 for the flag corresponding to the block that it is to write to next to be cleared by the second data transfer process 21b.

However, the arrangement of step 32 of the second data transfer process 21b also ensures that there will not be transfer of data from a block of the frame buffer 4 to the display 6 unless the first data transfer process 21a has completed writing data to that block. Accordingly, the possibility of tearing is eliminated. Also, this is achieved without requiring the provision of two parallel frame buffers. It is the division of the frame buffer 4 into blocks and the individual transfer of data into and out of the blocks that allows this.

It will be seen from the FIG. 6 that the first data transfer process 21a writes data from the video buffer 20 to the frame buffer 4 in a direction perpendicular to the direction of the writing of data by the second data transfer process 21b from the frame buffer 4 to the display 6. In a conventional single frame buffer system in which there was a different direction of the writing of data into and out of a frame buffer, it would not be possible to write data from the frame buffer to a display without having waited for the entire frame buffer to have been filled with data from a preceding video buffer. However, the division of the frame buffer 4 into blocks allows data to be written from one part of the frame buffer 4 to the display 6 whilst a different part of the frame 4 is being written to with data from the video buffer 20.

However, it will be appreciated that the system will function equally well if data is written from the video buffer 20 to the frame buffer 4 in the same direction in which it is written from the frame buffer 4 to the display 6. Thus, the direction of the writing of data from the video buffer 20 to the frame buffer 4 is not critical, which allows the technique to be used with or without rotator DMA.

Accordingly, the system 17 can be used in a device in which the orientation of the display 6 may be required to be changed between landscape and portrait, whilst avoiding image tearing and whilst avoiding the need for additional hardware, except perhaps a small number of hardware interrupts.

The interrupts 42, 46, 50, 54 and 58 that occur when the second data transfer process 21b has completed writing the first line of a relevant block of data from the frame buffer 4 to the display 6 can be implemented in any suitable way. They may be hardware interrupts. Alternatively, they may be software interrupts. Still further, they may not be interrupts in the conventional sense, but could instead be simple lines of code in the program operated by the MCU 18 in implementing the second data transfer process 21b.

The interrupts 48, 52, 56 and 60 which result when the first data transfer process has completed writing the data into the relevant block of the frame buffer 4 may be implemented in hardware, software, or in any other suitable way.

In this example, the interrupts 42, 46, 50, 54, 58 that allow data to be written for the next frame into the previous block are located at the end of the first line of the block. However, this is merely an example, and any other suitable location may be used instead. It is required only that it is immediately assured that the preceding block has been fully refreshed to the display 6, although the earlier notification occurs the better it is since this delay in writing data to the frame buffer 4 from the video buffer 20 can be minimised.

There can be any number of blocks, provided there are at least two blocks.

In the above embodiment, it is preferable that the refreshing of the display 6 is faster than the writing of image data 2. Preferably, the size of the blocks increases across the frame buffer 4. The size of the blocks is optimised for the relative speeds of the two processes 21a and 21b. The time taken to write image data 2 to a block $i_a$ is equal to or slightly more than the time taken to copy image data from the larger block $i_b = i_a + 1$ and refresh it on the display 6.

The interrupts 46, 50, and 54 indicate to the process 21a that a block has been refreshed on the display, indicating that the next frame for that block can be written to the frame buffer 4. However, since in this example the refreshing of a block to the display 6 is faster than the writing of image data 2 to the frame buffer 4 for the proceeding block, it will be appreciated that these interrupts are not essential. Accordingly, if the block sizes are selected properly having regard to the relative DMA transfer process speeds, the interrupts 46, 50, 54 can be omitted. However, the interrupts 48, 52, 56, and 60 ensure that, in any block, image data 2 is written to the frame buffer 4 before it is refreshed on the display 6. The interrupts 42 and 58 then ensure that image data 2 for the next frame is written to the last block before the second block of the next frame is refreshed. In this way, the refreshing of image data 2 on the display 6 can be assured to be at least one block ahead of writing image data 2 to the frame buffer 4 at all times.

If the writing process 21a has a speed S1 and the copying process 21b has a speed S2, then each block after the first is able to have a maximum size equal to the size of the immediately preceding block * S2/S1. Thus, the size of the blocks increases according to a square law. If the interrupts 46, 50, 54 are to be omitted, the size of each block may be slightly less than the maximum block size, in case the copying process 21b slows slightly or the writing process 21b speeds up slightly.

In another embodiment (not shown), the writing of image data 2 to the frame buffer 4 is faster than the refreshing of the display 6. In this case, it is preferable that sequential blocks decrease in size. The size of the blocks is optimised for the relative speeds of the two processes 21a and 21b. Preferably, the time taken to write image data 2 to a block of the buffer is the same as or slightly less than the time taken to copy the immediately following block and refresh it on the display 6.

In the case when the processes 21a and 21b have approximately equal speeds, the blocks can have approximately equal sizes, and all the interrupts indicated in FIG. 6 are necessary to ensure that image tearing does not occur.

Another advantage of providing blocks on the frame buffer 4 is that partial updating of an image frame can be performed. This is useful when the image data in a certain one of the blocks does not change from on frame to the next, such as the image data representing menus.

Although the present invention as been described with respect to the above embodiments, it should be apparent to those skilled in the art that modifications can be made without departing from the scope of the invention. For instance, any number of blocks can be provided.

What is claimed is:

1. A method comprising:
  using a memory control unit to divide a buffer comprising a two dimensional array of memory cells into at least first and second blocks, the at least first and second blocks being sized to substantially prevent image tearing where the size of each of the at least first and second blocks is dependent on a copying process and a writing process of sequential ones of the blocks;
  writing data to a first one of the blocks;
  copying said data from the first one of the blocks to a corresponding block of a display;
  displaying an image corresponding to the data from the first one of the blocks;
  wherein the writing and copying steps are repeated for sequential ones of the blocks such that the writing and copying of the data from the sequential blocks occurs partly simultaneously, and wherein the writing of data to the blocks is in a direction perpendicular to the direction of copying data from the blocks and each block after the first block has a maximum size substantially equal to a size of the immediately preceding block times a ratio of a speed of the copying process and a speed of the writing process of sequential ones of the blocks.

2. A method as claimed in claim 1, further comprising:

detecting that the writing of data to the first one of the blocks of the buffer is complete; and in response to the detection, allowing the copying of the data into the corresponding block of the display.

3. A method as claimed in claim 2, wherein the detecting step is initiated by an interrupt.

4. A method as claimed in claim 1, further comprising:

detecting that the copying step is completed in respect of the first one of the blocks; and in response to the detection, allowing the writing of replacement data to the first one of the blocks.

5. A method as claimed in claim 4, wherein the detecting step is initiated by an interrupt.

6. A method as claimed in claim 1, wherein each block except for the first block is larger than the immediately preceding block.

7. The method of claim 1, wherein the data written to the buffer represents one image frame, further comprising, after data for an image frame has been written to the last block of the buffer, writing data to the first block of the buffer for the next image frame.

8. A computer readable medium encoded with a computer program, the computer program comprising a set of instructions that when executed by a computer, cause the computer to perform the method of displaying an image as claimed in claim 1.

9. A method as claimed in claim 1, wherein the size of the at least first and second blocks is optimized for relative speeds of the copying and writing processes.

10. Apparatus comprising:

a buffer comprising a two dimensional array of memory cells;

a display; and a memory control unit arranged to divide the buffer into at least first and second blocks, to write data to a first one of the blocks, and to copy said data from the first one of the blocks to a corresponding block of the display, the at least first and second blocks being sized to substantially prevent image tearing where the size of each of the at least first and second blocks is dependent on a copying process and a writing process of sequential ones of the blocks;

wherein the memory control unit is also arranged to write data to sequential ones of the blocks sequentially and copy data for sequential ones of the blocks sequentially such that the writing and copying of the data from the sequential ones of the blocks occurs partly simultaneously, and wherein the writing of data to the blocks is in a direction perpendicular to the direction of copying of data from the blocks and each block after the first block has a maximum size substantially equal to a size of the immediately preceding block times a ratio of a speed of the copying process and a speed of the writing process of sequential ones of the blocks.

11. Apparatus for displaying an image as claimed in claim 10, further comprising a first Direct Memory Access channel arranged to write the data to the buffer.

12. Apparatus for displaying an image as claimed in claim 11, further comprising a second Direct Memory Access channel arranged to copy the data from the buffer to the display.

* * * * *